United States Patent [19]

Sandberg

[11] 4,358,819
[45] Nov. 9, 1982

[54] ELECTRICAL CONVERTER EQUIPMENT HAVING REDUCED HARMONIC CIRCUITS

[75] Inventor: Lennart Sandberg, Vasterås, Sweden

[73] Assignee: ASEA Aktiebolag, Vasteras, Sweden

[21] Appl. No.: 156,233

[22] Filed: Jun. 3, 1980

[30] Foreign Application Priority Data

Jun. 25, 1979 [SE] Sweden ............................... 7905534

[51] Int. Cl.³ .......................................... H02M 1/12
[52] U.S. Cl. ................................. 363/68; 318/345 G; 363/128
[58] Field of Search ............... 318/341, 345 C, 345 G; 363/68, 71, 72, 128

[56] References Cited

U.S. PATENT DOCUMENTS

| 3,878,451 | 4/1975 | Ostlund et al. ............... 363/68 X |
| 4,020,411 | 4/1977 | Tsuboi et al. ..................... 363/68 |
| 4,030,018 | 6/1977 | Tsuboi ................................... 363/68 |

FOREIGN PATENT DOCUMENTS 2853619 6/1979 Fed. Rep. of Germany .
1253423 11/1971 United Kingdom .

Primary Examiner—A. D. Pellinen
Attorney, Agent, or Firm—Pollock, Vande Sande & Priddy

[57] ABSTRACT

A static electrical converter equipment has a plurality of controllable converter bridges connected to a common a.c. supply source. Control pulse devices supply control pulses to the controllable valves of the bridges. The converter equipment comprises members arranged to prevent a control pulse from being supplied to a valve in one of the bridges, for initiating a commutation in this bridge, until a corresponding commutation in another bridge is completed.

5 Claims, 2 Drawing Figures

ELECTRICAL CONVERTER EQUIPMENT HAVING REDUCED HARMONIC CIRCUITS

TECHNICAL FIELD

This invention relates to a static electrical converter equipment having at least two controllable converter bridges connected to the same a.c. network and having control devices which supply control pulses to the controllable valves of the bridges.

A converter connected to an a.c. network generally generates harmonic currents in the a.c. network, that is, sinusoidal a.c. components with frequencies which are integer multiples of the fundamental tone frequency of the a.c. network. These harmonic currents cause disadvantages of various kinds, among other things interference in signal and telecommunications lines. To limit this interference to within acceptable limits, special measures are often required. One example of a case where such special measures are required is in the operation of electric locomotives having d.c. drive motors, which are supplied, via controllable converters in the locomotive, from a contact line carrying alternating voltage. Especially at high frequencies of the alternating voltage (50–60 Hz), there are often required large and thus heavy, expensive and space-demanding filters to reduce the harmonic currents and thus the interference in the signal or telecommunications lines disposed near to the contact line. In a locomotive of this kind, the converter operates with maximum direct voltage for the major part of the operating time, and for this manner of operation it is therefore of importance to limit the harmonic currents and thus the signal and telecommunications interference.

The present invention aims to provide a converter equipment in which the harmonic currents are reduced and therefore the signal and telecommunications interference and/or the dimensions of the necessary filters are reduced.

DISCLOSURE OF INVENTON

According to the invention, in an electrical converter equipment comprising at least two converter bridges with controllable valves connected to the same a.c. network, and control means which delivers control pulses to the controllable valves of the bridges, said control means comprises blocking members arranged to prevent a control pulse from being delivered to a controllable valve in a first of said bridges until a commutation in a second of said bridges, occurring during the same half-period of the alternating voltage of said network, is completed.

Said control means may comprise sensing members arranged to sense when the commutation of said second bridge is completed. In this case, said sensing members may comprise voltage-sensing members arranged so as to sense the magnitude of the alternating voltage supplied to said second bridge.

BRIEF DESCRIPTION OF DRAWINGS

The invention will now be described, by way of example, with reference to the accompanying drawings, in which.

DESCRIPTION OF PREFERRED EMBODIMENT

Figure 1:
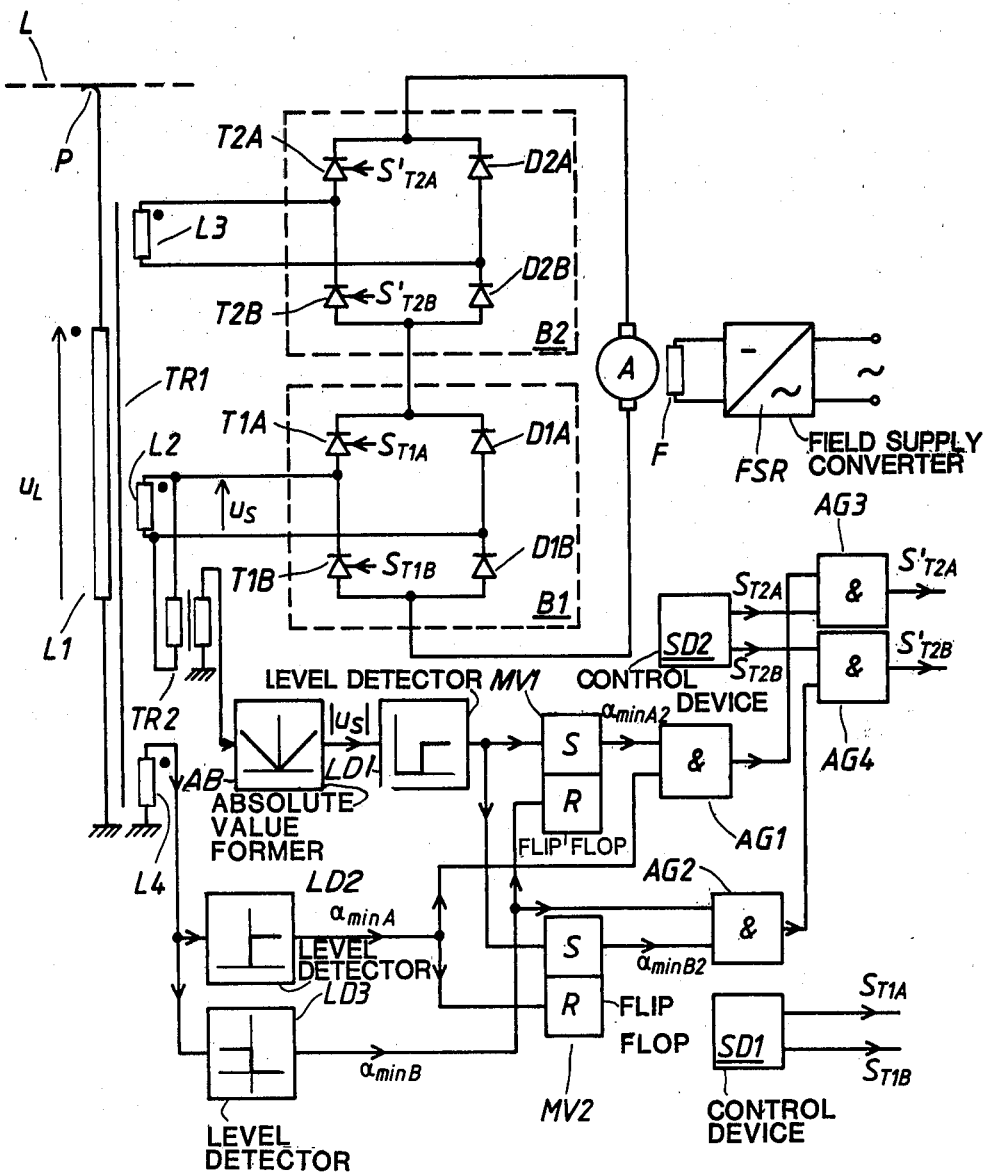
FIG. 1 is a circuit diagram of a static electrical converter according to the invention.

The converter shown in FIG. 1 has two single-phase semicontrolled converter bridges B1 and B2, which are connected in series on their d.c. sides and are connected to the armature A of a separately-excited d.c. motor (the field winding F of the motor being supplied from a separate converter FSR). The a.c. terminals of the bridges are connected to the secondary windings L2 and L3 of a transformer TR1, the primary winding L1 of which is connected to an alternating voltage source having a voltage $U_L$. In the example shown the motor may consist of a drive motor of a vehicle, for example an electric locomotive. The alternating voltage source may then consist of a contact line L to which the transformer winding L1 is connected via a currrent collector P.

Each of the bridges B1, B2 comprises two thyristor branches, T1A, T1B and T2A, T2B, respectively, as well as two diode branches, D1A, D1B and D2A, D2B, respectively. The direct voltages of the bridges are controlled by control devices SD1 and SD2 of the bridges supplying control pulses with a variable control angle to the thyristors of the bridges. The control device SD1 emits control pulses $S_{T1A}$ and $S_{T1B}$ to the thyristors T1A and T1B in the bridge B1. The control device SD2 supplies control pulses $S_{T2A}$ and $S_{T2B}$ to the thyristors T2A and T2B in the bridge B2. The bridges are controlled in a known manner so that, upon an increase of the direct voltage from zero to full value, the voltage of the bridge B1 first increases from zero to full value, with the voltage of the bridge B2 equal to zero, after which the voltage of the bridge B2 is increased to full value.

According to the invention, the bridge B2 is prevented from starting its commutation until the corresponding commutation of the bridge B1 is completed. This is accomplished as follows:

A transformer TR2 is connected to the secondary winding L2 of the transformer TR1. The voltage from the transformer TR2 corresponds to the alternating voltage $U_S$ supplied to the bridge B1. The secondary voltage of the transformer TR2 is supplied to an absolute value former AB, the output signal of which is proportional to the absolute value of the voltage $U_S$. The output signal is supplied to a level detector LD1, the output signal of which is "1" if the absolute vaue of $U_S$ exceeds a predetermined value, and otherwise "0". The output signal from the detector LD1 is supplied to flip-flops MV1 and MV2 and, when it becomes "1", switches the flip-flops to the position in which their output signals $\alpha_{minA2}$ and $\alpha_{minB2}$ are "1". The secondary voltage from a winding L4 of the transformer TR1 is supplied to the level detectors LD2, the output signal $\alpha_{minA}$ of which is "1" when $U_S$ is positive, and LD3, the output signal $\alpha_{minB}$ of which is "1" when $U_S$ is negative. The signal $\alpha_{minA}$ is supplied to an AND gate AG1 and to the R-input of the flip-flop MV2, the output signal of which is set to zero when $\alpha_{minA}$ becomes "1". The signal $\alpha_{minB}$ is supplied to an AND gate AG2 as well as to the R-input of the flip-flop MV1, the output signal of which is set to zero when $\alpha_{minA}$ becomes "1". The output signals $\alpha_{minA2}$ and $\alpha_{minB2}$ of the flip-flops MV1 and MV2 are supplied to the AND gates AG1 and AG2.

The output signals $S_{T2A}$ and $S_{T2B}$ from the control device SD2 as well as the output signals from the AND gates AG1 and AG2 are supplied to two AND gates AG3 and AG4, the output signals $S'_{T2A}$ and $S'_{T2B}$ of which constitute control pulses for the thyristors T2A and T2B in the bridge B2.

The flip-flop MV1 is set to zero by the signal $\alpha_{minB}$ at the start of each one of the half-periods during which the thyristor T2A is not current-carrying. AT the beginning of the next half-period a control pulse is supplied to the thyristor T1A in the bridge B1 (this bridge is assumed to be controlled to maximum direct voltage), and a commutation operation is started in this bridge. During this process the a.c. connections of the bridge are in principle short-circuited, and the alternating voltage $U_S$ of the bridge is therefore low. The detection level of the detector LD1 is chosen so that its output signal is "0" during the commutating process. When the commutation is completed to the voltage $U_S$ increases to a value which is nearly equal to the line voltage $U_L$. The output signal of the detector LD1 then switches to a "1", as well as the output signal $\alpha_{minA2}$ from the flip-flop MV1. Since the signal $\alpha_{minA}$ is "1" during this half-period, the output signal from the AND gate AG1 becomes "1" at the same time. Therefore only at this moment, i.e. when the commutation in the bridge B1 is completed, can a control pulse $S_{T2A}$ be forwarded to the thyristor T2A in the bridge B2. Independently of when the control pulse $S_{T2A}$ is supplied from the control device SD2, a commutation will therefore never be initiated in the bridge B2 until the moment when a corresponding commutation in the bridge B1 is completed.

In a corresponding manner, the circuit MV2, AG2 and AG4 prevent a control pulse $S'_{T2B}$ from being supplied to the thyristor T2B until, at the earliest, the moment when a corresponding commutation (to the thyristor T1B) in the bridge B1 is completed.

Figure 2:
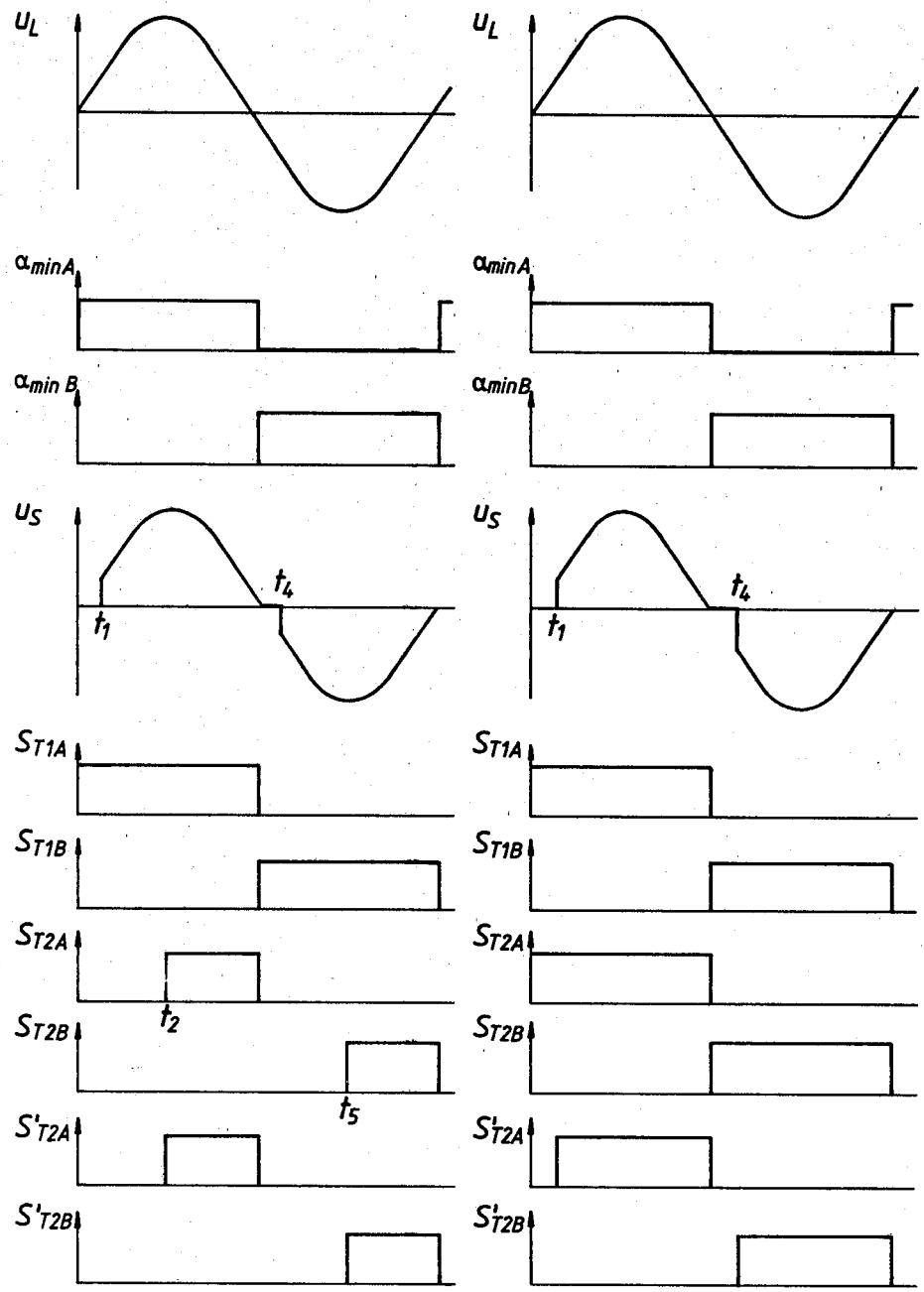
FIG. 2 is a series of graphs showing some of the quantities occurring in a converter according to the invention.

FIG. 2 is a series of pairs of graphs showing some of the voltages and signals referred to above, plotted as a function of time t. The uppermost pair of graphs show the line volage $U_L$ and the pairs of grahs below the uppermost pair show the signals $\alpha_{minA}$ and $\alpha_{minB}$. Below these, the pairs of graphs show, in downward order, the alternating voltage $U_S$ of the bridge B2, the control pulses from the control devices SD1 and SD2, and the control pulses $S'_{T2A}$ and $S'_{T2B}$. The left-hand graph of each pair in the Figure relates to operation with a control angle $\alpha = 90°$ of the bridge B2 and the right-hand graph of each pair relates to operation when the bridge B2 is controlled to maximum direct voltage, i.e. $\alpha = 0$. The bridge B1 is assumed to operate all the time with $\alpha = 0$, i.e. to supply maximum direct voltage.

In the left-hand graphs in FIG. 2, the thyristor T1A starts to conduct at $t = 0$, and at $t = t_1$ the commutation is terminated. The signal $\alpha_{minA2}$ then becomes "1", and since $\alpha_{minA}$ is "1" for the whole of this half-period, after $t = t_1$ a control pulse $S_{T2A}$ from SD2 will immediately be admitted by the AND gate AG3. This control pulse arrives at $t = t_2$ (corresponding to $\alpha = 90°$).

The corresponding process takes place during the next half-period. At $t = t_4$ the commutation in the bridge B1 is completed, and at $t = t_5$ a corresponding commutation is initiated in the bridge B2.

In the case shown in the right-hand graphs of FIG. 2, the two bridges are assumed to have maximum direct voltage, i.e. the control devices SD1 and SD2 deliver control pulses with the control angle $\alpha = 0$. At $t = 0$, a commutation is initiated and at $t = t_1$ a commutation is completed in bridge B1. Only at $t = t_1$ does the output signal from the AND gate AG1 become "1", and the control pulse $S_{T2A}$ is only then admitted to the thyristor T2A.

The corresponding process takes place during the next half-period, where the commutation in bridge B1 is completed and the commutation in bridge B2 is started at $t = t_4$.

The case described above is somewhat simplified. Thus, the voltage $U_S$ will to a certain extent be influenced by the commutating process in the bridge B2. Usually, also the control angle $\alpha$ is limited in a downward direction, for example to $\alpha_{min} = 5°$. The level detectors LD2 and LD3 are then formed so that the signals $\alpha_{minA}$ and $\alpha_{minB}$ become "1" only when $\alpha = 5°$ and $\alpha = 185°$, respectively. Similarly, in practice $U_S > 0$ during the commutating process in bridge B1, and this must be taken into consideration when selecting the threshold level of the detector LD1.

As will be clear from the foregoing description, the mode of operation of the converter differs from that of prior art converters only when the converter operates with maximum direct voltage, when, according to the invention, a simultaneous commutation of the two bridges is prevented. At a lower direct voltage of the converter, the mode of operation is not influenced, since the converters then operate with different control angles and a simultaneous commutaton therefore does not occur. As mentioned in the introduction, however, the operating case with maximum direct volage is of special interest. In, for example, a typical electric locomotive, the converter operates with maximum direct voltage at speeds exceeding 50-60 per cent of top speed, that is, for the major part of the operating time.

Since, in the above example, the bridge B2 is prevented from commutating until the bridge B1 has completed its commutation, the bridge B2 will operate with a somewhat higher control angle (at maximum direct voltage of the converter) than in prior art converters. The deterioration of the power factor of the converter caused by this fact is, however, insignificant, typically only a few per cent.

The surprisingly great reduction of the harmonic currents obtained in a converter according to the invention, is probably due to the rate of change of the line current becoming only half as great in the case of one as in the case of two simultaneously commutating converters, and also due to the reactance of the converter transformer becoming considerably higher in the case of only one simultaneously commutating converter.

The invention is not limited to use in connection with the converter equipment shown in FIG. 1. It may, for example, be used for converter equipment comprising several branches, having separate load objects or a common load object, in which each branch consists of one or more bridges connected in series on their d.c. sides, which bridges may be connected to the alternating voltage source via separate transformers or a common transformer. The bridges may then be divided into two or more groups with one or more bridges in each group, where a commutation in one group is prevented until a corresponding commutation in another group has been completed.

In the foregoing description, single-phase converter bridges have been shown and described, but the invention may also be applied to converter bridges having a different phase number, for example three-phase bridges.

In the foregoing description a preferred embodiment has been shown in which sensing members (LD1) sense when the commutation in a bridge has been completed. Since the commutating time (at otherwise constant conditions) depends on the commutating voltage and on the direct current, the commutating time may instead be calculated from these quantities and the control pulse to the latter bridge be delayed by the calculated time relative to the control pulse to the former bridge.

It has been found that the harmonic currents in a converter equipment according to the invention in typical cases are reduced to values which are only 30-60 per cent of the harmonic currents in prior art converters. This results in a corresponding reduction of the signal and telecommunications interference, caused by the harmonic currents, or, alternativey, a considerable reduction of the dimensions of the filter circuits which are required for restricting the harmonic currents to a desired level.

What is claimed is:

1. An electrical converter equipment comprising at least two converter bridges with controllable valves connected to the same a.c. network, and control means which delivers control pulses to the controllable valves of the bridges, said control means including means for preventing a control pulse from being delivered to a controllable valve in a first of said bridges until a commutation in a second of said bridges, occurring during the same half-period of the alternating voltage of said network, is completed.

2. A converter equipment according to claim 1, in which said control means includes sensing means arranged to sense when the commutation of said second bridge is completed.

3. A converter equipment according to claim 2, in which the sensing means comprises voltage-sensing means arranged to sense the magnitude of the alternating voltage supplied to said second bridge.

4. A converter equipment according to any of the preceding claims, comprising two converter bridges connected in series on their d.c. sides, in which, upon an increase of the direct voltage of the converter from its lowest value, the direct voltage of said second bridge is first increased to its maximum value and thereafter the direct voltage of said first bridge is increased from its lowermost value to its maximum value.

5. A converter equipment according to any of claims 1 to 3, in which said converter bridges are connected to said a.c. network via a common converter transformer.

* * * * *